United States Patent [19]

Rice et al.

[11] Patent Number: 4,543,189

[45] Date of Patent: Sep. 24, 1985

[54] REMOVAL OF COMPLEXED ZINC-CYANIDE FROM WASTEWATER

[75] Inventors: Michael A. Rice, Bethlehem; Stewart T. Herman, Hellertown, both of Pa.

[73] Assignee: Bethlehem Steel Corp., Bethlehem, Pa.

[21] Appl. No.: 620,363

[22] Filed: Jun. 13, 1984

[51] Int. Cl.$^4$ .............................................. C02F 1/52
[52] U.S. Cl. .................................... 210/713; 210/724; 210/726; 210/904; 210/912; 75/107; 423/101; 423/367
[58] Field of Search ................. 75/107, 109; 210/713, 210/719, 721, 724, 726, 738, 904, 912; 423/101, 102, 367

[56] References Cited

U.S. PATENT DOCUMENTS

| 3,575,853 | 4/1971 | Gaughan et al. | 210/713 |
| 3,738,932 | 6/1973 | Kostenbader | 210/713 |
| 3,931,007 | 1/1976 | Sugano et al. | 210/721 |
| 4,169,053 | 9/1979 | Sakakibara et al. | 210/912 |
| 4,211,646 | 7/1980 | Westbrook et al. | 210/904 |
| 4,312,760 | 1/1982 | Neville | 210/904 |
| 4,465,597 | 8/1984 | Herman et al. | 210/713 |

Primary Examiner—Peter Hruskoci
Attorney, Agent, or Firm—John J. Selko

[57] ABSTRACT

A method of removing complexed zinc-cyanide from wastewater involving a multiple stage process including, in a first step, control of ferrous ions to a critical minimum concentration of 250 to 400 ppm, together with pH control in the first and also a second step, together with recycling of a portion of sludge precipitated in the process.

6 Claims, 5 Drawing Figures

REMOVAL OF COMPLEXED ZINC-CYANIDE FROM WASTEWATER

BACKGROUND OF THE INVENTION

1. Field of the Invention

This invention is directed to a method for treating wastewater, such as blast furnace blowdown water, for removal of zinc and cyanide.

2. Description of Prior Art

In steel plant blast furnace technology, water is utilized to cool and cleanse gases coming out of the furnace. Such water is generally recycled, but a certain portion of this water is removed from the system for discharge into the environment. Such discharge water contains soluble zinc and cyanide which are objectionable. Such discharge water containing soluble zinc and free cyanide is referred to herein as blast furnace blowdown.

Environmental standards governing zinc and cyanide contents are stated in terms of total amounts of each element permitted in the discharged wastewater. Presently, the Environmental Protection Agency mandated maximum concentration for total zinc is 0.45 ppm for blast furnace blowdown. As one skilled in the art knows, a total amount of zinc is composed of that portion of zinc still in solution as a soluble compound (herein referred to as soluble zinc) plus that portion of zinc which is in solid precipitated form but still in suspension (referred to herein as suspended zinc). There are conventional means for effectively removing most but not all suspended zinc, such as high-rate filtration. Therefore, it becomes apparent that for a given inlet soluble zinc concentration, in order to reach the mandated total zinc standard, one must first reduce soluble zinc far enough below the total zinc standard so that any unremoved suspended zinc will not raise the total zinc to above the limit. Of course, the further below the total zinc standard a removal process lowers soluble zinc, the greater amount of suspended zinc permitted before the total zinc standard is reached. Therefore, there is a need for a process which removes soluble zinc at least to a level below total zinc standards (0.45 ppm) sufficient to permit the soluble zinc plus suspended zinc to be less than the total zinc standard.

A similar set of circumstances applies to cyanide. Presently, the Environmental Protection Agency mandated maximum concentration for total cyanide is 3 ppm for blast furnace blowdown. Cyanide which is soluble and available to react with zinc is referred to herein as free cyanide. Total soluble cyanide includes free cyanide (as defined herein) plus a soluble ferrocyanide and/or a soluble ferricyanide which, unlike free cyanide, are not available to react with zinc. Free cyanide will react with soluble zinc to form a zinc-cyanide complex, which is an environmentally harmful complex that is not removed from solution by traditional pH adjustment of the water.

One method for removing soluble zinc from acid steel plant wastewater consists of treating wastewater with a mixture of alkali-water slurry and recycled sludge formed later in the method. This mix neutralizes the acidity of the wastewater and precipitates a substantial portion of the zinc value as solids which settle out as a sludge, a portion of which is recycled as described above. Such process is described in commonly assigned U.S. patent application Ser. No. 291,439 filed Aug. 10, 1981, by Stewart T. Herman et al. The process described therein is referred to as a high density sludge process. Unfortunately, this process is not effective for treating zinc-cyanide complexes.

A method for removing cyanide which has been complexed with zinc in a wastewater is disclosed in U.S. Pat. No. 4,312,760 issued Jan. 26, 1982 to Roy G. Neville. The method disclosed therein requires the addition of ferrous sulfate in the presence of bisulfite ions. Neville discloses using a ferrous ion concentration of 200 to 300 ppm. Neville also requires the presence of bisulfite ions and the presence of an oil layer on top of the water to be treated to avoid oxidation of ferrous ion to ferric ion. Ferric ion will not react with complexed zinc-cyanide. It is, therefore, desirable to develop a process which does not require the expense and added step of bisulfite addition and an oil covering.

SUMMARY OF THE INVENTION

This invention can lower soluble zinc and free cyanide levels of blast furnace blowdown without the disadvantages of the prior art. The invention includes a multiple stage process wherein the first stage includes addition of ferrous ions to a critical minimum concentration of 250 to 400 ppm, while the pH of the water is held below 7.0 by means of addition of a mineral acid, e.g. sulfuric or hydrochloric acid. Such acid may already be present with the source of ferrous iron as in the case of waste pickling liquors from steel mills.

The wastewater in a second reactor next has its pH adjusted to between 9.5 to 10.0 to cause zinc to precipitate as zinc hydroxide and to cause the cyanide to precipitate as prussian blue. As an alternative, sludge from a settling tank is recycled to a third reactor and mixed with an alkaline material, whereupon the mixture is processed back to the second reactor, such that the amount of dry solids recycled per unit time is equal to between 20 and 100 times the amount precipitated per unit time in the second reactor, and the pH is controlled to between 8.8 and 9.4. Simultaneously with the pH adjustment and sludge recycling, the wastewater is stirred to prevent settling of precipitates. Thereafter, the wastewater is sent to a settling tank from which clean effluent overflows, and the sludge is sent to landfill, with a small portion recycled as described above.

DESCRIPTION OF PREFERRED EMBODIMENT AND BEST METHOD

Figure 1:
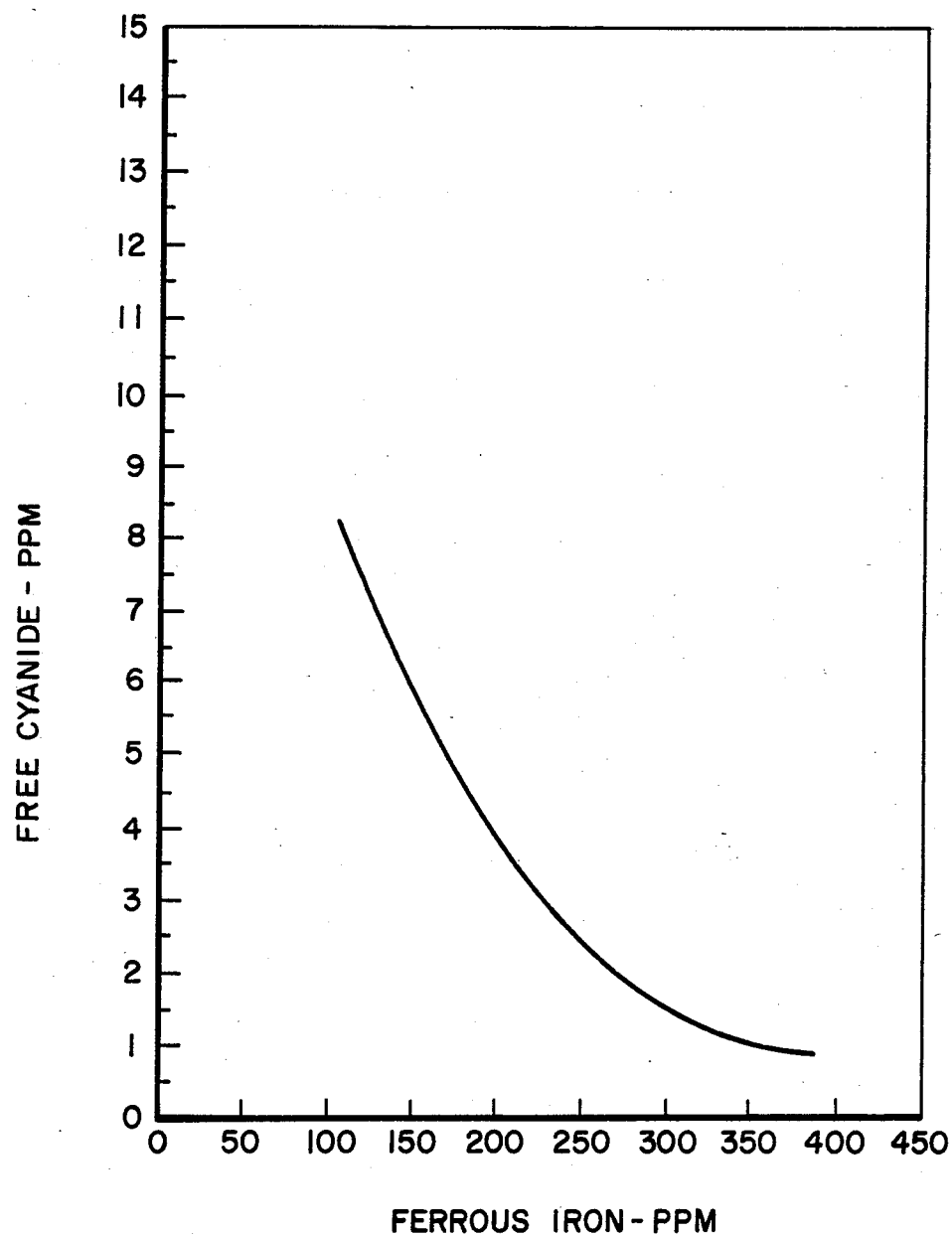
FIG. 1 is a graphical depiction of the unexpected relationship between free cyanide concentration (ppm) and ferrous ion concentration (ppm) in blast furnace blowdown.
Figure 2:
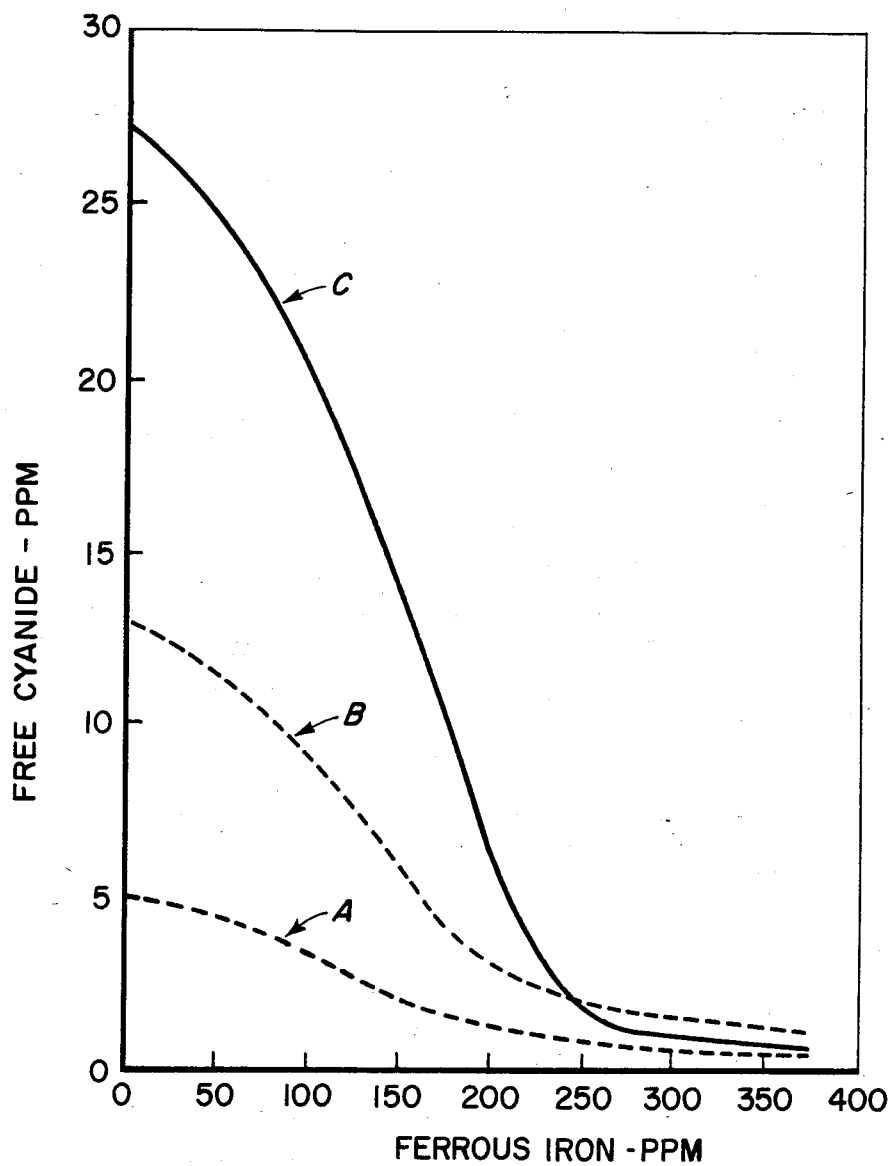
FIG. 2 is a graphical depiction of the unexpected relationship between free cyanide concentration (ppm) and ferrous ion concentration (ppm) for starting cyanide concentrations of 6, 15 and 30 ppm in blast furnace blowdown.

Referring now to the drawings, FIG. 1 shows the unexpected relationship between free cyanide (defined herein as cyanide available to react with soluble zinc) and the concentration of ferrous ion in a mixture of ferrous ions and blast furnace blowdown. As the curve in FIG. 1 suggests, free cyanide decreases to an unexpected low plateau (between 1–2 ppm) when ferrous ion concentration is in the range of 250 to 400 ppm. Such relationship was experimentally observed in blast furnace blowdown waters having a cyanide inlet concentration over a range of 6 ppm (curve A), 15 ppm (curve B) and 30 ppm (curve C) as shown in FIG. 2.

Figure 3:
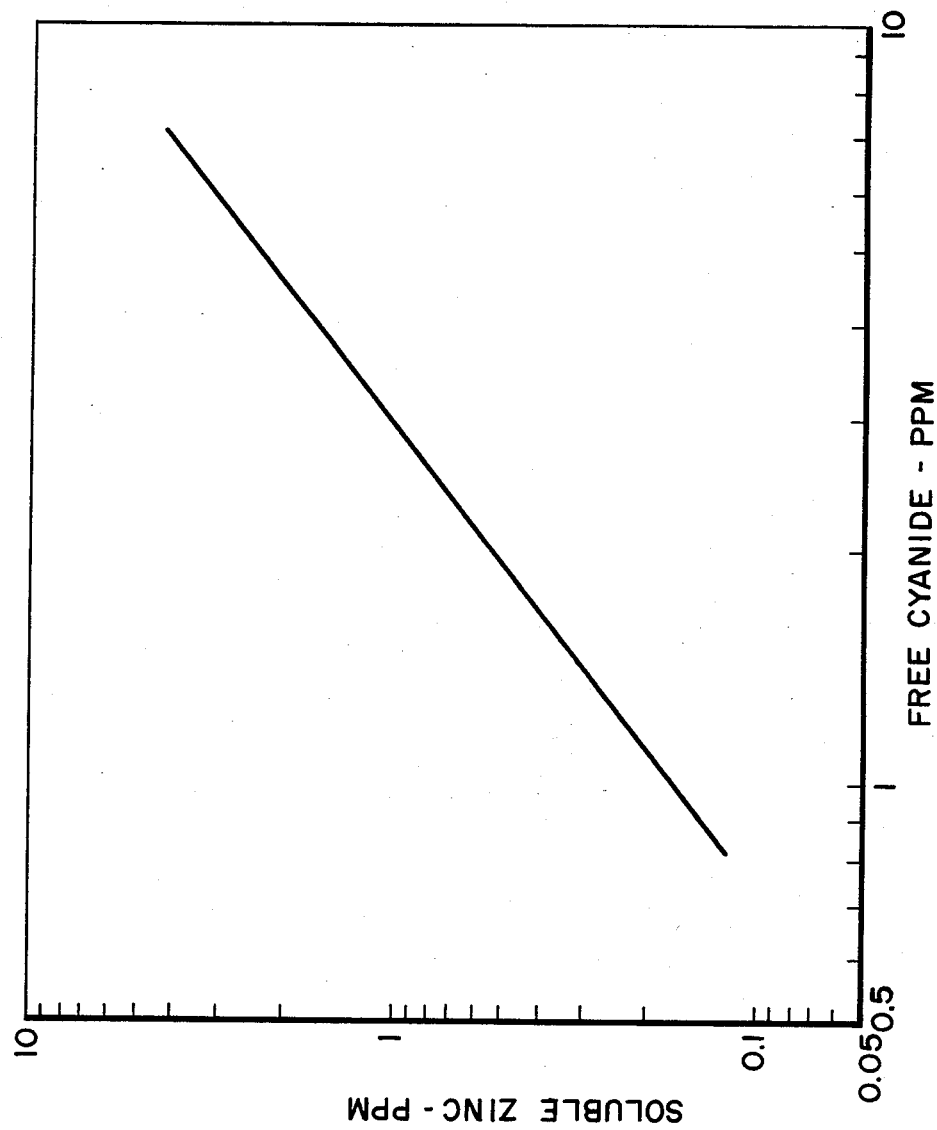
FIG. 3 is a graphical depiction of the unexpected relationship between soluble zinc concentration and free cyanide concentration in blast furnace blowdown.

As shown in FIG. 3, as the amount of free cyanide in the blast furnace blowdown is reduced, the concentration of soluble zinc decreases due to the destruction of the zinc-cyanide complex. By reactions which will be described hereinafter, the zinc-cyanide complex is destroyed, and zinc is converted to zinc ions which can be precipitated as zinc hydroxide by proper pH control. Likewise, the cyanide is released from the zinc-cyanide complex to form soluble ferrocyanide which can be precipitated as prussian blue by proper pH control. Thus, it can be understood that by a combination of lowering of free cyanide through excess presence of ferrous ions and removal of soluble zinc by proper pH control, a dual mechanism is disclosed for lowering both cyanide and soluble zinc to acceptable levels.

Figure 4:
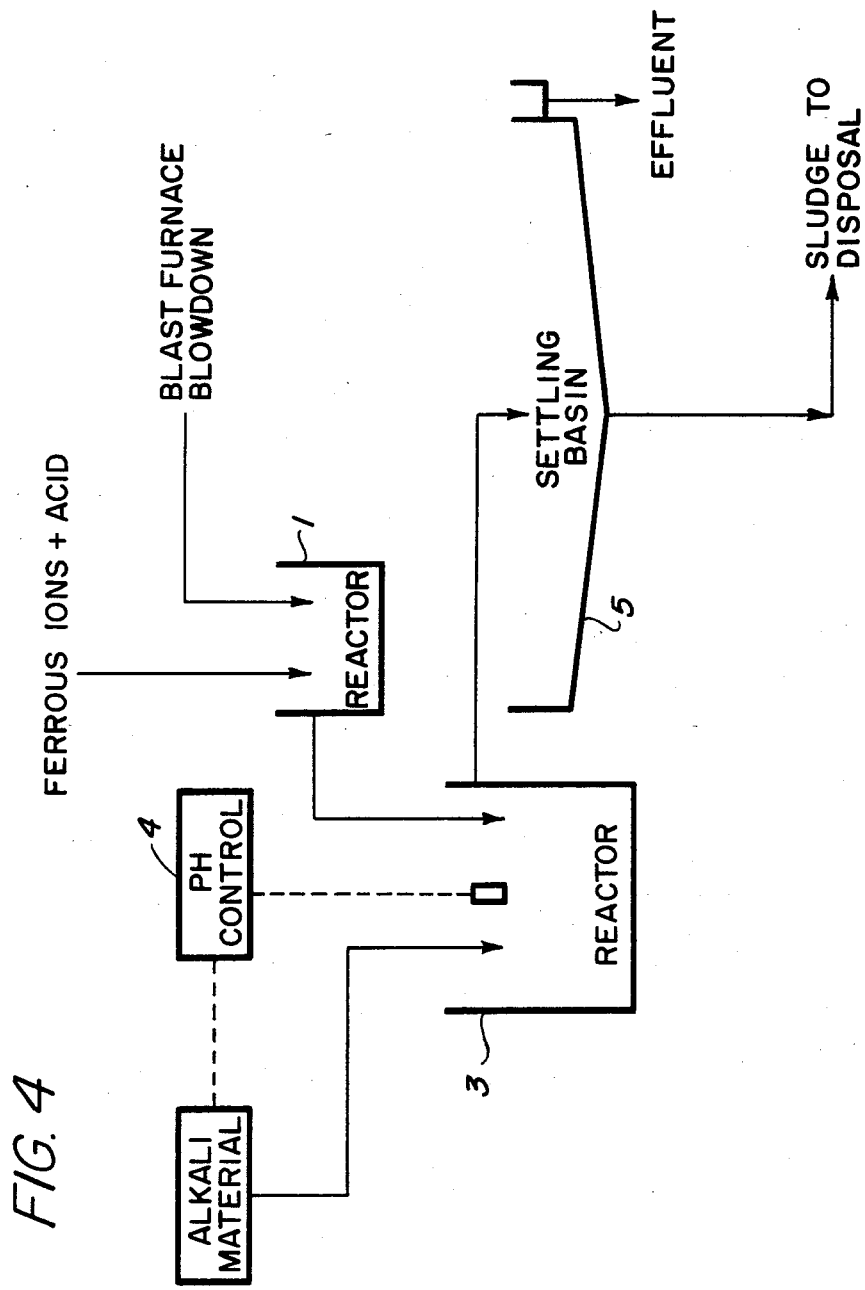
FIG. 4 is a diagrammatic flow sheet showing the invention without sludge recycling.

FIG. 4 discloses a flow diagram of a process of the invention. Incoming blast furnace blowdown to be treated is processed to a first reactor 1.

As used herein, the term "processed" includes flow by gravity or movement by means of suitable pumping and valving devices. Sufficient soluble ferrous ion in the form of aqueous ferrous sulfate, aqueous ferrous chloride or other aqueous soluble ferrous salts is added to provide a concentration of ferrous ion of at least 250 to 400 ppm. It is important that the pH in reactor 1 be maintained below 7 in order to keep all the ferrous ions in solution and available to break the zinc-cyanide complex. The pH is controlled by means of the addition of a mineral acid, e.g. sulfuric or hydrochloric acid. Such acid may already be present with the source of ferrous ion as in the case of waste pickling liquors from steel mills.

In reactor 1, the zinc-cyanide complex is broken by the affinity of ferrous ion for cyanide according to the following reaction:

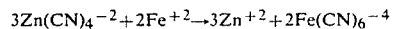
$$3Zn(CN)_4^{-2} + 2Fe^{+2} \rightarrow 3Zn^{+2} + 2Fe(CN)_6^{-4}$$

Thus, zinc-cyanide complex is converted to free zinc ion (which can be precipitated at a later stage by pH control as described below) plus soluble ferrocyanide which precipitates as prussian blue in the presence of excess ferrous ion at a later stage by pH control.

The mixture is processed as overflow from first reactor 1 to a second reactor 3, where pH is adjusted to between 9.5 and 10.0 by means of addition of an alkaline material, e.g., aqueous lime, sodium hydroxide or sodium carbonate. The pH control is accomplished automatically by conventional pH measuring and controlling device 4. At this pH range, zinc ion precipitates as zinc hydroxide according to the following reaction:

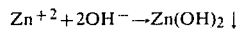
$$Zn^{+2} + 2OH^- \rightarrow Zn(OH)_2 \downarrow$$

Also at this pH, the iron cyanide complex (ferrocyanide) in the presence of excess ferrous ion precipitates as prussian blue according to the following reaction:

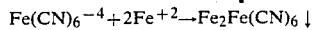
$$Fe(CN)_6^{-4} + 2Fe^{+2} \rightarrow Fe_2Fe(CN)_6 \downarrow$$

Also at this pH, any excess ferrous ion precipitates as ferrous hydroxide according to the following reaction:

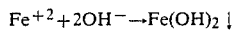
$$Fe^{+2} + 2OH^- \rightarrow Fe(OH)_2 \downarrow$$

The contents of reactors 1 and 3 are continuously stirred by conventional stirring devices (not shown), in order to keep solids suspended therein.

The contents of reactor 3 are next processed to settling basin 5, to permit the solid matter (zinc hydroxide, prussian blue and ferrous hydroxide) to settle out. Overflow from settling basin 5 now only contains soluble zinc in an amount less than 0.45 ppm, and a soluble cyanide in an amount of less than 3 ppm. Such overflow can now be discharged, or sent to further treatment to remove solids, if necessary in order to meet the standards for total zinc and/or cyanide. The precipitates being settled in settling basin 5 settle out slowly, and in order to enhance this settling process, the effluent can also be passed to a conventional filter process (not shown) in order to lower the total suspended solids, and thereby lower total zinc and total cyanide content before such effluent is discharged. Sludge underflow can be removed from settling basin 5 for dumping.

In order to densify the sludge, to make disposal of the sludge easier, we prefer to treat and recycle the settled sludge according to the steps disclosed in commonly assigned U.S. patent application Ser. No. 291,439 filed Aug. 10, 1981 by Stewart T. Herman et al.

Figure 5:
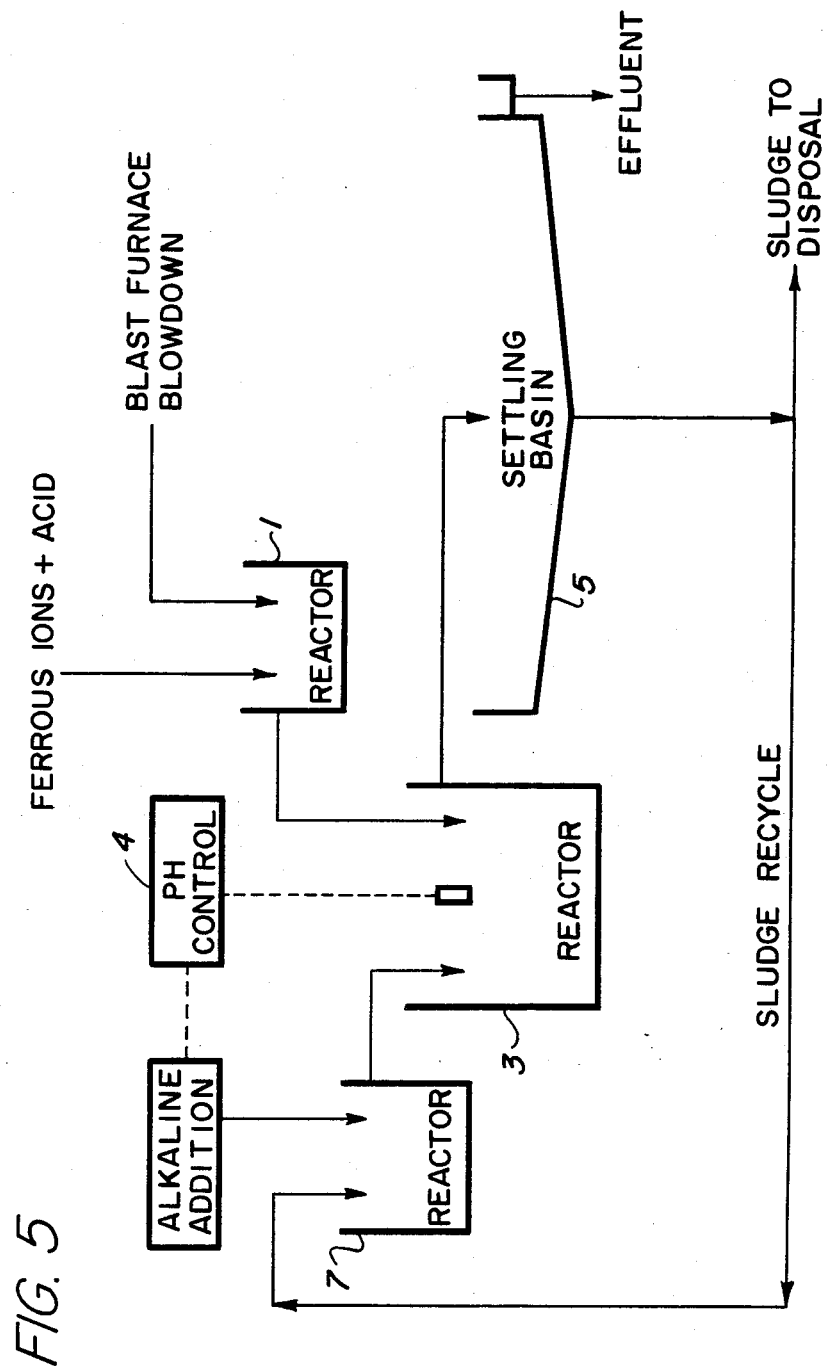
FIG. 5 is a diagrammatic flow sheet showing the invention having sludge recycling.

Generally, these steps are shown in FIG. 5. Settled sludge from settling basin 5 is recycled to a third reactor 7 such that the amount of solids recycled to the third reactor 7 per unit time is equal to between 20 and 100 times the amount of solids precipitated per unit time in the second reactor 3. The recycled sludge is mixed with an alkaline material, e.g. a lime solution, in the third reactor 7 under control of pH measuring and controlling device 4.

After sufficient time in reactor 7, overflow mixture is processed into second reactor 3, where it combines with overflow from first reactor 1. In this instance, pH is preferably kept at about 8.8 and 9.4 for optimum zinc removal.

SPECIFIC EXAMPLE

Wastewater having soluble zinc in the range of 10 to 75 ppm and free cyanide in the range of 6 to 30 ppm were processed in a continuous process at a flow rate of 125 ml/min to a first reactor where aqueous ferrous sulfate was added at a rate of 10 ml/min to maintain ferrous ion concentration of 300 ppm in the first reactor. The pH was maintained at or below 7.0 by addition of sulfuric acid to the aqueous ferrous sulfate. Residence time of material in reactor 1 was 1 to 2 minutes, with overflow being processed to a second reactor, where pH was maintained at between 8.8 and 9.2 and where a portion of recycled sludge was added at the rate of approximately 20 to 50 times the amount of solids precipitated per unit time in reactor 1, after the sludge had been previously mixed in a third reactor with sufficient lime to maintain the appropriate pH in the second reactor. Residence time in the second reactor was approximately 5 minutes. The pH measuring and controlling device was a Leeds and Northrup Speedomax W Recorder.

The contents of the second reactor were processed to a settling basin, where solids settled out, providing an effluent for discharge and a sludge for recycling and discharge.

Such treatment resulted in an effluent having a soluble free cyanide concentration of less than 2 ppm, and a soluble zinc concentration of between 0.10 and 0.30 ppm, with a total soluble cyanide concentration of less than 3 ppm.

We claim:

1. A method for removing soluble zinc and soluble cyanide from blast furnace blowdown wastewater comprising:
   (a) processing to a first reactor a wastewater containing between 6 and 30 ppm of soluble cyanide and between 15 and 75 ppm soluble zinc, with the cyanide and zinc consisting essentially of a soluble zinc-cyanide complex compound;
   (b) in the first reactor:
      (i) adding soluble ferrous ion from the group consisting of ferrous sulfate, ferrous chlorides, or other soluble ferrous salt to bring the ferrous ion to between at least 250 to 400 ppm;
      (ii) controlling the pH of the wastewater to below 7.0; and
      (iii) stirring the wastewater to keep solids in suspension;
   (c) processing the wastewater to a second reactor;
   (d) in the second reactor:
      (i) raising the pH of the wastewater to between 9.5 and 10.0 to form precipitates of prussian blue, zinc hydroxide and ferrous hydroxide; and
      (ii) continuously stirring the wastewater to keep the precipitates in suspension; and
   (e) processing the wastewater to a settling basin where precipitated zinc hydroxide, prussian blue and ferrous hydroxide settle into a sludge, leaving a liquid having a soluble zinc content of less than 0.45 ppm and a total soluble cyanide content of less than 3 ppm.

2. The invention of claim 1 in which the ferrous ion in the first reactor breaks the zinc-cyanide complex to form soluble zinc ion and soluble ferrocyanide according to the following reaction:

$$3Zn(CN)_4^{-2} + 2Fe^{+2} \rightarrow 3Zn^{+2} + 2Fe(CN)_6^{-4}.$$

3. The invention of claim 2 in which the precipitates are formed according to the following reactions:

$$Zn^{+2} + 2OH^- \rightarrow Zn(OH)_2 \downarrow$$

$$Fe(CN)_6^{-4} + 2Fe^{+2} \rightarrow Fe_2Fe(CN)_6 \downarrow$$

$$Fe^{+2} + 2OH^- \rightarrow Fe(OH)_2$$

4. The invention of claim 3 in which the pH in the second reactor is raised by the addition of alkaline material selected from the group consisting of aqueous lime, caustic soda, and sodium carbonate.

5. The invention of claim 4 in which the pH in the first reactor is controlled by the use of a mineral acid.

6. The invention of claim 4 in which a portion of the sludge from the settling basin is processed to a third reactor where it is mixed with water and an alkaline material selected from the group consisting of aqueous lime, caustic soda, and sodium carbonate, and thereafter processed to the second reactor wherein a pH is maintained between 8.8 and 9.4.

* * * * *